United States Patent Office 3,494,928
Patented Feb. 10, 1970

3,494,928
1-SUBSTITUTED-3-OXO(OR THIOXO)HEXA-
HYDRO-IMIDAZO(1,5-a)PYRIDINES
Albert J. Frey, Essex Fells, and Robert E. Manning,
Mountain Lakes, N.J., assignors to Sandoz Inc.,
Hanover, N.J.
No Drawing. Filed Oct. 5, 1967, Ser. No. 673,005
Int. Cl. C07d 29/34
U.S. Cl. 260—293.4                         5 Claims

ABSTRACT OF THE DISCLOSURE

This disclosure pertains to novel 1-phenyl-imidazo[1,5-a]pyridines and their method of preparation. These compounds are useful as hypotensive agents.

---

This invention relates to novel heterocyclic compounds and more particularly to novel imidazo pyridines. Still more particularly, this invention concerns 1-phenyl-2-unsubstituted imidazo pyridines, and their method of preparation. The compounds of this invention may be represented by the formula

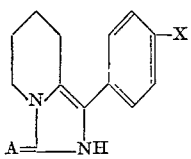

where

A represents O or S; and
X represents Cl or H.

These compounds are prepared by reaction of a phenyl piperidyl ketone and metal cyanate or thiocyanate. The overall process is illustrated by the following flow diagram.

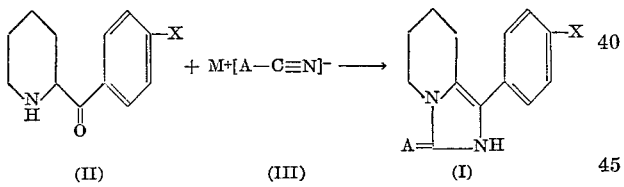

where A and X are as described above and M is an alkali metal.

The compounds of Formula I may also be represented by their tautomeric equivalent

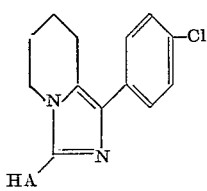

wnere A is as previously described.

In order to simplify this description, however, Formula I only will be used, but is should be understood that either of the tautomeric forms may be represented.

In the process according to this invention, the compounds represented by II above are treated with a metal cyanate or metal thiocyanate such as alkali metal cyanate or thiocyanate III. Examples of metal cyanates and thiocyanates which may be used include potassium cyanate, potassium thiocyanate, sodium cyanate, sodium thiocyanate and the like. The reaction may take place at or near room temperature and is preferably conducted over a sufficient period of time as to allow high yields. Reaction times of about 1 to 24 hours and temperatures of from about 25° to 125° C. are preferred. Solvents may be used in connection with this method and illustrative of the solvents which may be utilized are acetic acid, water, lower alkanols and the like. However, it should be understood that neither the solvent nor the temperature at which the reaction takes place is critical to the success of the process. The product 2-unsubstituted imidazo pyridines I may be isolated using conventional techniques such as filtration, recrystallization and the like.

The starting compounds utilized in accordance with this invention are known and are prepared by methods described in the literature.

The imidazo pyridines are represented by Formula I and are useful because they possess pharmacological properties in animals. In particularly, these compounds are useful as hypotensives, as indicated by their activity in anesthetized dog tested by blood pressure measurement using a mercury manometer or transducer via a catheter inserted in the carotid or femoral artery. When so utilized, the imidazopyridines of Formula I may be combined with one or more pharmaceutically acceptable carriers or adjuvants. They may be administered orally or parenterally, depending upon the compound employed and the mode or administration. The exact dosage utilized may vary. Satisfactory results are obtained when these compounds are administered at a daily dosage of about 5 milligrams to about 30 milligrams per kilogram of animal body weight. This daily dosage is preferably administered from 2 to 4 times a day, or in sustained release form. For most large mammals the total daily dosage is from about 100 milligrams to about 510 milligrams. Dosage forms suitable for internal use comprise from about 25 milligrams to about 250 milligrams of active ingredient I in intimate admixture with a solid or liquid pharmaceutically acceptable carrier or diluent.

A representative formulation suitable for oral administration is a tablet prepared by known tabletting techniques which contains the following:

| Ingredients: | Parts by weight |
|---|---|
| 1-para-chlorophenyl-3-oxo - 2,3,5,6,7,8 - hexahydro-imidazo[1,5-a]pyridine | 50 |
| Tragacanth | 2 |
| Lactose | 39.5 |
| Corn starch | 5 |
| Talcum | 3 |
| Magnesium stearate | 0.5 |

The compounds of Formula I above also find use as anorexics and in such use may be administered by the same modes and in the same quantities as in the hypotensive utilization.

The following examples are provided for the purpose of illustration and not by way of limitation.

EXAMPLE 1

1-p-chlorophenyl-3-oxo-2,3,5,6,7,8-hexahydro-imidazo
[1,5-a]pyridine

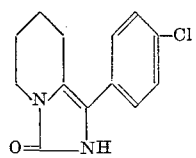

p-Chlorophenyl-2-piperidyl ketone (11.5 g.), potassium cyanate (8.0 g.) glacial acetic acid (50 ml.) and water (225 ml.) are mixed and then stirred for 4 hours. The resultant solid is collected by filtration to give 6.8 g. of crude product. Recrystallization from methanol give 5.9 g. of 1-p-chlorophenyl-3-oxo-2,3,5,6,7,8-hexahydro-imidazo[1,5-a]pyridine; M.P. 298° to 302° C.

EXAMPLE 2

1-p-chlorophenyl-3-thioxo-2,3,5,6,7,8-hexahydro-imidazo[1,5-a]pyridine

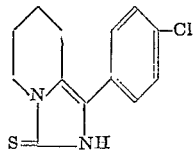

A solution of sodium thiocyanate (8.0 g.) in water (50 ml.) is added dropwise over 5 minutes to a stirred solution of p-chlorophenyl-2-piperidyl ketone (11 g.) in glacial acetic acid (50 ml.) and water (200 ml.).

The reaction mixture is stirred for 20 minutes and the resultant solid is collected by filtration to give 17 g. solid which is refluxed in 190 ml. glacial acetic acid for 3 hours. After cooling, the crystals are collected to give 10.4 g. of crude product; M.P. 293°. Recrystallization from dimethylformamidemethanol (1:3) gives 1-p-chlorophenyl - 3 - thioxo - 2,3,5,6,7,8 - hexahydro-imidazo [1,5-a]pyridine; M.P. 300° to 302° C.

EXAMPLE 3

1-phenyl-3-oxo-2,3,5,6,7,8-hexahydro-imidazo [1,5-a]pyridine

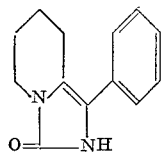

Phenyl-2-piperidyl ketone (10 g.), 57 ml. glacial acetic acid, 750 ml. water and 9.2 g. potassium cyanate are mixed and stirred at room temperature overnight. The aqueous phase is decanted from the gummy product and the latter is crystallized twice from methanol to give 1.4 g. of 1-pheneyl-3-oxo - 2,3,5,6,7,8 - hexahydro-imidazo [1,5-a]pyridine; M.P. 243° to 245° C.

What is claimed is:

1. An imidazo pyridine of the formula

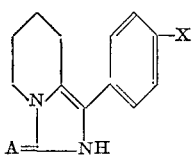

where

A is O or S; and
X is Cl or H.

2. An imidazo pyridine of claim 1 which is 1-phenyl-3-oxo-2,3,5,6,7,8-hexahydro-imidazo[1,5-a]pyridine.

3. An imidazo pyridine of claim 1 which is 1-p-chlorophenyl-3-oxo - 2,3,5,6,7,8 - hexahydro - imidazo[1,5-a] pyridine.

4. An imidazo pyridine of claim 1 which is 1-p-chlorophenyl-3-thioxo - 2,3,5,6,7,8 - hexahydro-imidazo[1,5-a] pyridine.

5. A process for preparing an imidazo pyridine of the formula

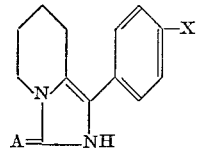

which comprises treating a compound of the formula

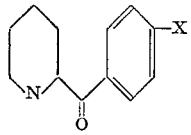

with a compound of the formula $$M^+[A\!-\!\!-\!C\!\equiv\!N]^-$$

where

A is O or S
X is H or Cl; and
M is an alkali metal.

References Cited

UNITED STATES PATENTS

| | | | |
|---|---|---|---|
| 1,915,334 | 6/1933 | Salzberg et al. | 260—243 |
| 2,075,359 | 3/1937 | Salzberg et al. | 167—22 |

OTHER REFERENCES

Burger: Medicinal Chemistry, vol. 1, 1951, pp. 38, 39, 44, 45 and 48.

HENRY R. JILES, Primary Examiner

S. D. WINTERS, Assistant Examiner

U.S. Cl. X.R.

260—294, 294.7; 424—267